US010087742B2

(12) United States Patent
Goodman et al.

(10) Patent No.: US 10,087,742 B2
(45) Date of Patent: Oct. 2, 2018

(54) FIXTURE AND TOOL FOR USE IN FACILITATING COMMUNICATION BETWEEN TOOL AND EQUIPMENT

(71) Applicant: HALLIBURTON ENERGY SERVICES, INC., Houston, TX (US)

(72) Inventors: George David Goodman, Houston, TX (US); Oleg Bondarenko, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 32 days.

(21) Appl. No.: 15/503,863

(22) PCT Filed: Sep. 29, 2014

(86) PCT No.: PCT/US2014/058080
§ 371 (c)(1),
(2) Date: Feb. 14, 2017

(87) PCT Pub. No.: WO2016/053243
PCT Pub. Date: Apr. 7, 2016

(65) Prior Publication Data
US 2017/0275983 A1 Sep. 28, 2017

(51) Int. Cl.
E21B 47/12 (2012.01)
E21B 47/01 (2012.01)
E21B 47/18 (2012.01)
(52) U.S. Cl.
CPC .......... E21B 47/011 (2013.01); E21B 47/122 (2013.01); E21B 47/18 (2013.01)

(58) Field of Classification Search
CPC ...... E21B 47/011; E21B 47/12; E21B 47/122; G01V 3/00; G01V 11/00
(Continued)

(56) References Cited

U.S. PATENT DOCUMENTS 3,090,031 A    5/1963  Lord
4,525,715 A    6/1985  Smith
(Continued)

FOREIGN PATENT DOCUMENTS

WO    2012085495 A2    6/2012

OTHER PUBLICATIONS

International Search Report and Written Opinion; PCT Application No. PCT/US2014/058080; dated Jun. 15, 2015.
(Continued)

Primary Examiner — Albert K Wong
(74) Attorney, Agent, or Firm — Polsinelli PC

(57) ABSTRACT

A fixture for receiving a tool that facilitates communication between a tool and other equipment. The fixture includes a shroud sized to at least partially cover a circumference of a housing of the tool, and one or more current transformers or sensors which are coupled to the shroud. Each current transformer can inductively receive or inject, through the housing, a current from or into electronics contained within the housing of the tool. The induced current can be part of the communication between the tool and the equipment. The communication can be a data communication between the tool and the equipment, a transfer of electrical power from the equipment to the tool, or both. The tool can be a closed cavity without electrical or magnetic interfaces.

25 Claims, 11 Drawing Sheets

(58) Field of Classification Search
USPC .................................................... 340/854.4
See application file for complete search history.

(56) References Cited

U.S. PATENT DOCUMENTS

| | | | |
|---|---|---|---|
| 4,605,268 A | 8/1986 | Meador | |
| 5,051,980 A | 9/1991 | Olsen | |
| 6,064,210 A | 5/2000 | Sinclair | |
| 8,055,208 B2 | 11/2011 | Lilla et al. | |
| 8,191,628 B2 | 6/2012 | Konschuh et al. | |
| 8,330,615 B2 | 12/2012 | Hagen | |
| 2004/0108108 A1 | 6/2004 | Bailey et al. | |
| 2005/0046585 A1* | 3/2005 | Dodge | G01V 11/002 |
| | | | 340/853.3 |
| 2010/0052941 A1 | 3/2010 | Madhavan et al. | |
| 2011/0163890 A1* | 7/2011 | Bowles | E21B 17/028 |
| | | | 340/854.8 |
| 2012/0090827 A1 | 4/2012 | Sugiura | |
| 2012/0210793 A1 | 8/2012 | Daton-Lovett | |
| 2013/0206387 A1* | 8/2013 | Deville | E21B 47/12 |
| | | | 166/66.4 |
| 2014/0152458 A1* | 6/2014 | Hiorth | E21B 47/122 |
| | | | 340/854.4 |
| 2015/0346752 A1* | 12/2015 | Storm | E21B 41/0085 |
| | | | 700/297 |
| 2017/0051579 A1* | 2/2017 | Hay | E21B 41/00 |
| 2017/0204722 A1* | 7/2017 | Tran | E21B 47/12 |
| 2018/0163500 A1* | 6/2018 | Levert | E21B 33/0407 |

OTHER PUBLICATIONS

Extended European Search Report; European Application No. 14902994.4; dated May 4, 2018.

* cited by examiner

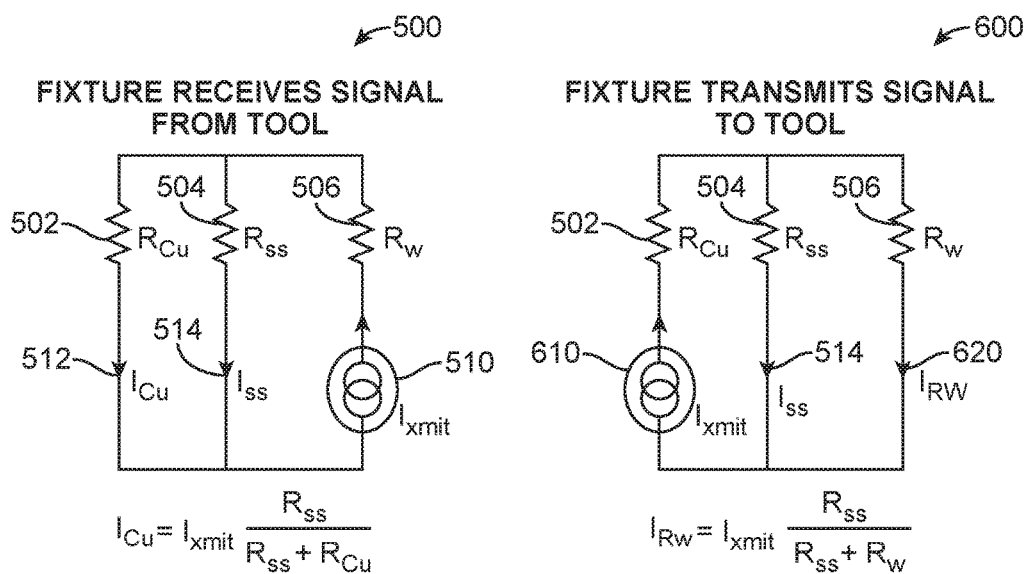
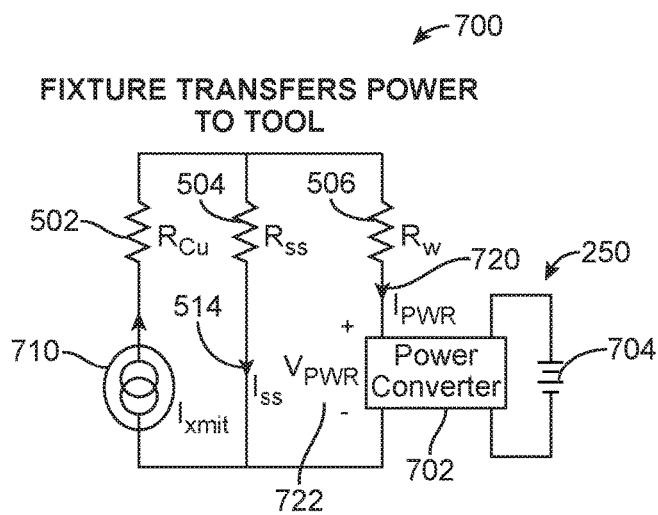

FIXTURE AND TOOL FOR USE IN FACILITATING COMMUNICATION BETWEEN TOOL AND EQUIPMENT

CROSS-REFERENCE TO RELATED APPLICATIONS

This application is a national stage entry of PCT/US2014/058080 filed Sep. 29, 2014, said application is expressly incorporated herein in its entirety.

FIELD OF THE TECHNOLOGY

The present disclosure relates generally to tools and fixtures for tools allowing communicating between the tools and other equipment.

DESCRIPTION OF THE RELATED ART

Tools designed to operate in downhole environments typically include pressure housings for protecting electronics and other sensitive components contained within them.

BRIEF DESCRIPTION OF THE DRAWINGS

Examples of the present disclosure will now be described by way of example with reference to attached figures, wherein:

FIG. 5 is a diagram illustrating an example of a first electrically equivalent circuit of a fixture assembly, according to aspects of the present disclosure;

FIG. 6 is a diagram illustrating an example of a second electrically equivalent circuit of a fixture assembly, according to aspects of the present disclosure;

FIG. 7 is a diagram illustrating an example of a third electrically equivalent circuit of a fixture assembly, according to aspects of the present disclosure;

DETAILED DESCRIPTION

Figure 1A:
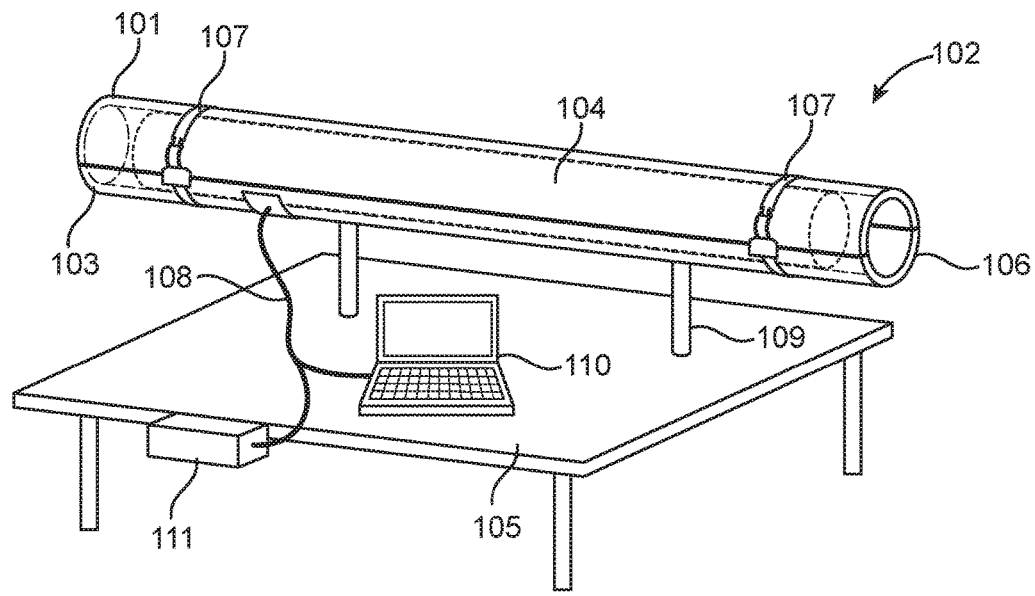
FIGS. 1A and 1B are diagrams illustrating an example environment within which a fixture assembly incorporating aspects of the present disclosure can be utilized.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts have been exaggerated to better illustrate details and features of the present disclosure.

In the following description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it can be deviated or horizontal. Correspondingly, the transverse, axial, lateral, longitudinal, radial and the like orientations shall mean orientations relative to the orientation of the wellbore or tool.

In one example of the present disclosure, a fixture for receiving a tool for facilitating a communication between the tool and other equipment is described. The fixture includes a shroud sized to at least partially cover an outside circumference of a housing of the tool, and one or more current transformers, which can include current sensors, are coupled to the shroud. Each current transformer is electrically connected to the shroud to inductively receive or inject, through the housing, a current from or into electronics contained within the housing of the tool. The induced current is part of the communication between the tool and the equipment. The communication can be a data communication between the tool and the equipment, a transfer of electrical power from the equipment to the tool, or both. The present disclosure also concerns the configuration of a tool.

Tools that are not designed for operation with conventional wireline services can have insufficient means for transferring stored data and/or replacing or recharging of internal batteries.

Accordingly, present technology provides for achieving data communications and/or power transfer between equipment and tool electronics contained within a sealed, electrically-conductive, closed housing. Other environments, outside of the downhole tool environment, can have the same or similar needs.

To illustrate one example environment within which the techniques of the present disclosure can be practiced, FIG. 1A is an environment within which a fixture assembly 102 of the present disclosure can be utilized. The fixture assembly 102 can include a tool 104 and a fixture 106 disposed at least partially around the tool 104. Fixture assembly 102 can be coupled to equipment 110 via a communication channel 108. The equipment 110 as illustrated is a laptop computer. In other examples, the equipment 110 can be one or more computers or other electronic device that are configured to store, transfer, or otherwise communicate with a tool 104. Also, as illustrated a power supply 111 can be coupled to the communication channel 108. In one example, the power supply 111 provides controlled power to the tool 104 via the fixture 106 as explained below. In other examples, the power supply can be integrated with the equipment 110.

Fixture 106 may facilitate communications between the tool 104 and the equipment 110 via the communication channel 108. The fixture assembly 102 can also include a communication channel 108 as illustrated. The communication channel can be coupled to equipment 110 and a power supply 111. In the illustrated example, the communication channel 108 is illustrated as a wired communication channel. In other examples, the communication channel 108 can be a wireless communication channel.

The tool 104 can be used in part of a drilling, logging or other operation in which the tool 104 is used downhole, as described further below with respect to FIG. 1C. Once the tool 104 is again on the surface, it can be installed in the fixture 106. The fixture 106 can then in turn be closed with the tool 104 at least partially inside thereof. As illustrated, the fixture 106 includes a pair of clamps 107 so that the tool 104 can be forced into substantial contact with the fixture 106. While a pair of clamps 107 is illustrated, it can be appreciated that more clamps can be implemented. In the illustrated example, the use of a pair of clamps requires less installation time as well as providing the key contact area for the electrical coupling of the fixture 106 and the tool 104. In another example, a single clamp 107 can be used.

The clamp 107 as illustrated provides for removal of a top half 101 of the fixture 106 from a bottom half 103 of the fixture 106. The bottom half 103 can be coupled to a stand or table 105 by one or more supports 109. The tool 104 can be installed into the bottom half of the fixture 106. The installation of the tool 104 can be such that it is laid into the bottom half 103 by one or more operators with or without mechanical assistance. The top half 101 can be placed over the bottom half 103 and secured to the bottom half 103 by one or more clamps 107.

While the fixture 106 has been described above as having a top half 101 and a bottom half 103, the top half 101 can be more or less than half of the fixture 106. Similarly, the bottom half 103 can be more or less than a half.

Figure 1B:
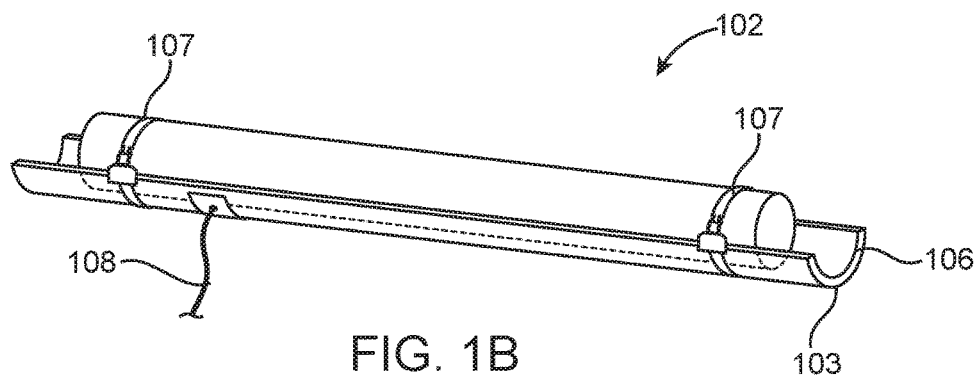

FIG. 1B presents a second example of fixture assembly 102, including a fixture 106. As illustrated, the fixture 106 is substantially a half of a cylinder, thus forming a bottom half 103. In other examples, the fixture 106 can be less than half of a cylinder but form a cradling surface on which the tool 104 can be placed. As illustrated, the fixture 106 includes a pair of clamps 107. The clamps 107 can be any type of clamping device such that the tool 104 is substantially pressed against the fixture 106 about the clamps 107. For example, the clamps can be made of a clasp, clasp receiving and strap portion. The present disclosure contemplates additional clamping devices that allow for the tool 104 to be held and pressed against fixture 106. While a pair of clamps 107 is illustrated, it can be appreciated that more clamps can be implemented. In the illustrated example, the use of a pair of clamps requires less installation time as well as providing the key contact area for the electrical coupling of the fixture 106 and the tool 104. The fixture assembly 102 can also include a communication channel 108 as illustrated. Similar to the fixture assembly 102 shown in FIG. 1A, the communication channel can be coupled to equipment 110 and a power supply 111. In the illustrated example, the communication channel 108 is illustrated as a wired communication channel. In other examples, the communication channel 108 can be a wireless communication channel.

Figure 1C:
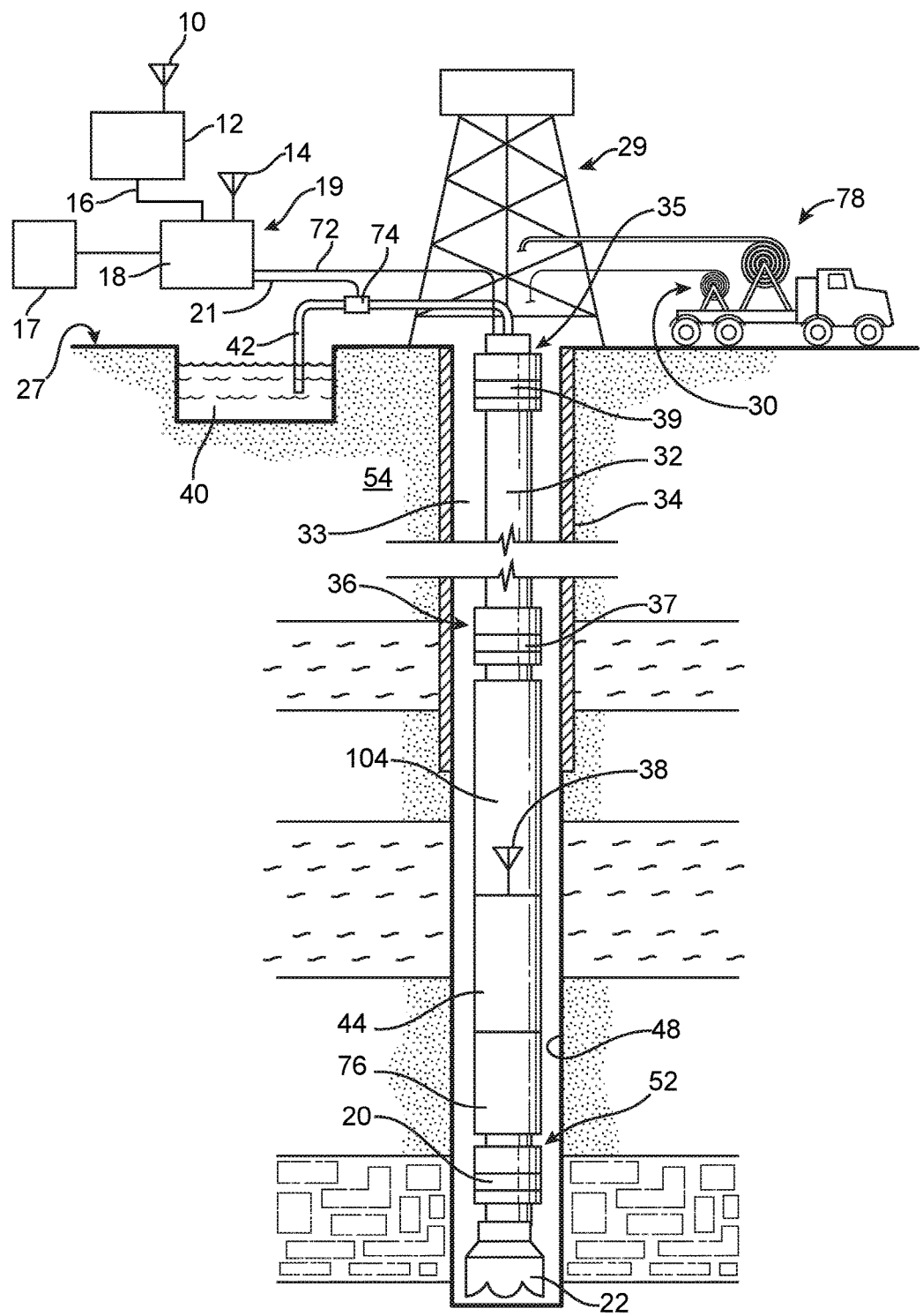
FIG. 1C is a diagram illustrating an example environment within which a tool can be employed in accordance with the principles of the present disclosure.

An example working environment for the tool 104 is illustrated in FIG. 1C where the tool 104 is depicted as being capably part of a drilling, logging or other operation where the tool 104 is used downhole. A wellbore 48 is shown that has been drilled into the earth 54 from the ground's surface 27 using a drill bit 22. The drill bit 22 is located at the bottom, distal end of the drill string 32 and the bit 22 and drill string 32 are being advanced into the earth 54 by the drilling rig 29. The drilling rig 29 can be supported directly on land as shown or on an intermediate platform if at sea. For illustrative purposes, the top portion of the well bore includes casing 34 that is typically at least partially comprised of cement and which defines and stabilizes the wellbore after being drilled.

As shown in FIG. 1C, the drill string 32 supports several components along its length. A sensor sub-unit 52 is shown for detecting conditions near the drill bit 22, conditions which can include such properties as formation fluid density, temperature and pressure, and azimuthal orientation of the drill bit 22 or string 32. In the case of directional drilling, measurement while drilling (MWD)/logging while drilling (LWD) procedures are supported both structurally and communicatively. The instance of directional drilling is illustrated in FIG. 1C.

The lower end portion of the drill string 32 can include a drill collar proximate the drilling bit 22 and a rotary steerable drilling device 20. The drill bit 22 may take the form of a roller cone bit or fixed cutter bit or any other type of bit known in the art. The sensor sub-unit 52 is located in or proximate to the rotary steerable drilling device 20 and advantageously detects the azimuthal orientation of the rotary steerable drilling device 20. Other sensor sub-units 35, 36 are shown within the cased portion of the well which can be enabled to sense nearby characteristics and conditions of the drill string, formation fluid, casing and surrounding formation. Regardless of which conditions or characteristics are sensed, data indicative of those conditions and characteristics is either recorded downhole, for instance at the processor 44 for later download, or communicated to the surface either by wire using repeaters 37, 39 up to surface wire 72, or wirelessly or otherwise. If wirelessly, the downhole transceiver (antenna 38 can be utilized to send data to a local processor 18, via topside transceiver (antenna 14. There the data may be either processed or further transmitted along to a remote processor 12 via wire 16 or wirelessly via antennae 14 and 10.

Utilization of the tool 104 in coiled tubing 78 and wireline 30 procedures is schematically indicated in FIG. 1C as being contemplated and within the context of this disclosure. The possibility of an additional mode of communication is contemplated using drilling mud 40 that is pumped via conduit 42 to a downhole mud motor 76. The drilling mud is circulated down through the drill string 32 and up the annulus 33 around the drill string 32 to cool the drill bit 22 and remove cuttings from the wellbore 48. For purposes of communication, resistance to the incoming flow of mud can be modulated downhole to send backpressure pulses up to the surface for detection at sensor 74, and from which representative data is sent along communication channel 21 (wired or wirelessly to one or more processors 18, 12 for recordation and/or processing.

The sensor sub-unit 52 is located along the drill string 32 above the drill bit 22. The sensor sub-unit 36 is shown in FIG. 1C positioned above the mud motor 76 that rotates the drill bit 22. Additional sensor sub-units 35, 36 can be included as desired in the drill string 32. The sub-unit 52 positioned below the motor 76 communicates with the sub-unit 36 in order to relay information to the surface 27.

A surface installation 19 is shown that sends and receives data to and from the well. The surface installation 19 can exemplarily include a local processor 18 that can optionally communicate with one or more remote processors 12, 17 by wire 16 or wirelessly using transceivers 10, 14.

Figure 2A:
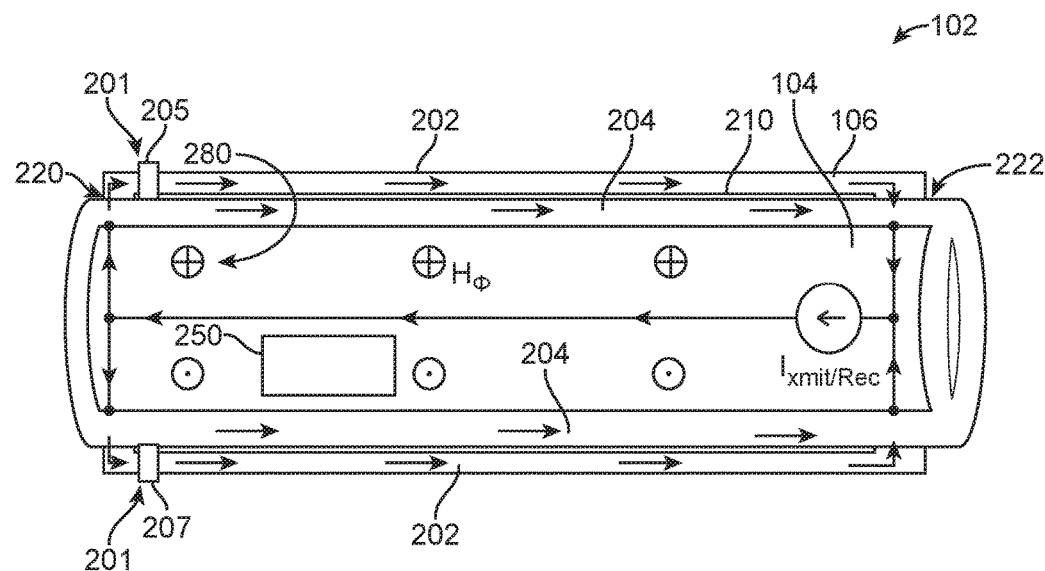
FIGS. 2A and 2B are diagrams illustrating example assemblies, according to aspects of the present disclosure.
Figure 2B:
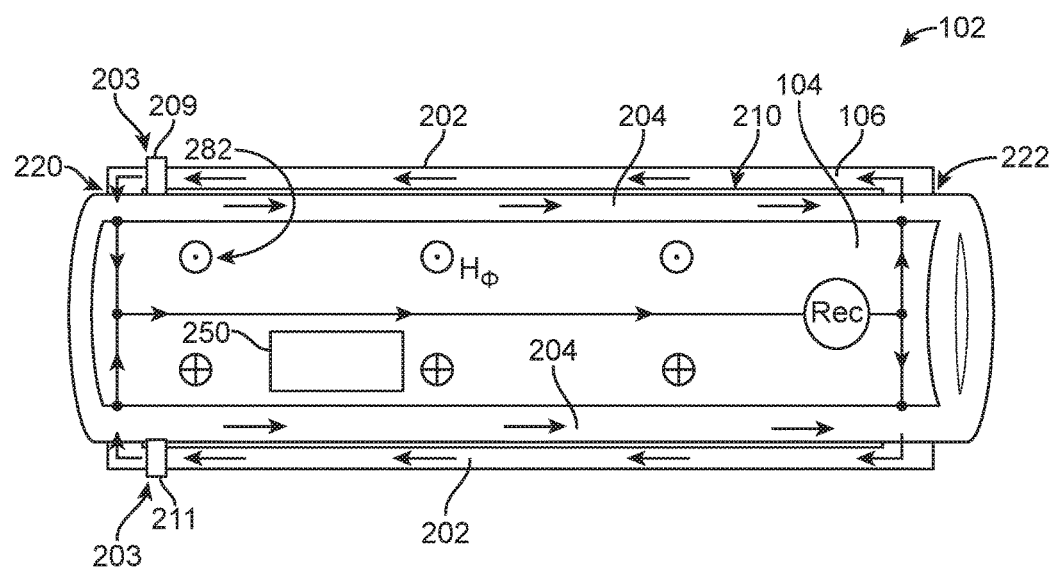

FIGS. 2A and 2B are cross-sectional views of the fixture assembly 102 of FIG. 1. In these figures, tool 104 is shown to include a housing 204 and electronics 250 contained within the housing 204. Electronics 250 can be, or can include, any suitable electronics or related components and will vary depending on the application of the tool 104. Housing 204 can be referred to as a "pressure" housing utilized for protecting the electronics 250 and other sensitive components contained therein. Housing 204 can be made of any suitable housing material, such as any suitable electrically conductive material (e.g. stainless steel specified as SS, or copper, specified as Cu. In some examples, housing 204 can be a sealed, non-magnetic, electrically conductive, closed housing which completely contains the electronics 250. In other examples, housing 204 can be made of a magnetic material.

As described above, electronics 250 can be or include any suitable electronics or related components, and will vary depending on the application of the tool 104. Electronics 250 in FIGS. 2A and 2B can be located anywhere throughout and within housing 204, although in the figures the electronics 250 are shown at a particular location for simplicity of illustration. Here, the electronics 250 can be or include any suitable electronic components, cabling, transceiver, transformer, microprocessor, memory, charging circuitry, batteries and the like.

Some example tool applications, among others, include a sealed tool housing without any exterior electrical connection means, Slickline tool applications (Slickline technology being a cabling technology used for oil well completions and maintenance, autonomous robotic tool applications, and Measurement While Drilling (MWD tool applications having no sidewall ports, or tools designed to operate in gaseous environments where intrinsic safety standards must be met.

Note however that, in conventional environments, tools 104 that are not designed for operation with a conventional wireline service have insufficient means for transferring stored data and/or replacing or recharging of internal batteries.

Fixture 106 of the present disclosure is shaped to receive tool 104 for facilitating a communication between the tool 104 and the equipment. The fixture 106 includes a shroud 202 sized to at least partially cover an outside circumference of the housing 204 and is sized to accommodate the tool 104. The fixture 106 further includes transceivers which include one or more current transformers 201/203 (or current sensors coupled to the shroud 202 (e.g. current transformers 205 and 207 in FIG. 2A, or current transformers 209 and 211 of FIG. 2B. In some examples, current transformers 203 can be current sensors.

Figure 3:
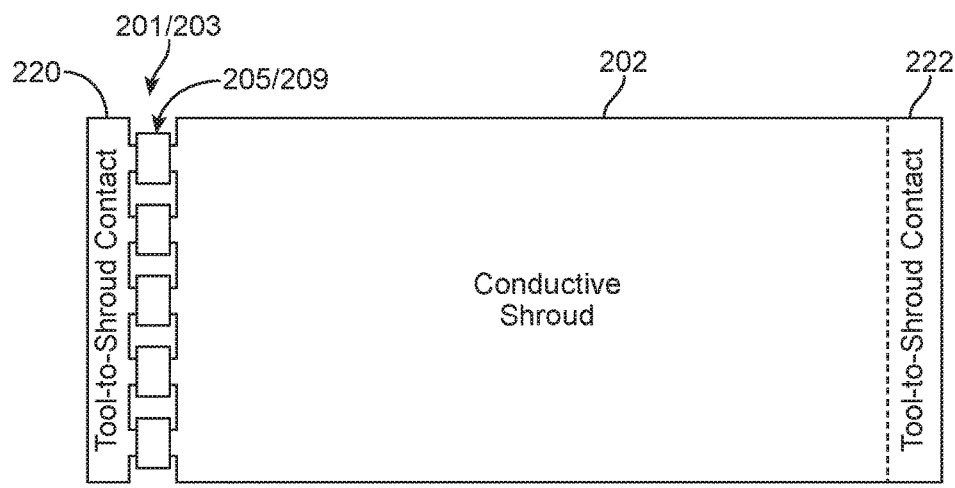
FIG. 3 is a diagram illustrating a shroud of an example fixture and a plurality of current transformers, according to aspects of the present disclosure.

To further illustrate in combination with FIGS. 2A and 2B, FIG. 3 is a planar view of the shroud 202 of the fixture. FIG. 3 further reveals the layout of the shroud 202 and the plurality of current transformers 201/203 coupled thereto which can operate as transceivers. The shroud 202 can be made of a highly-electrically conductive material, such as Copper (Cu. By way of example, the shroud 202 can be formed into a cylindrical trough shape spanning less than 360 degrees, allowing the tool to be received within it. Being positioned in locations as shown in FIGS. 2A, 2B, and 3, shroud 202 can be clamped (e.g. pressure contacted, high pressure mechanical means at least partially around the housing 204 of the tool at first and second ends using a clamp, strap, or the like, thereby forming first and second contact surfaces 220 and 222 with the housing 204 of the tool 104. The contact surfaces 220 and 222 permit the flow of current between the housing 204 and shroud 202. Current transformers 201/203 are attached and coupled as shown in FIG. 3, as separate circuits along shroud 202. The current transformers 201/203 can be electrically connected to first and second contact surfaces 220 and 222.

The fixture 106 as shown in FIGS. 2A and 2B can further include an electrically insulative layer 210 disposed or formed between shroud 202 and housing 204 of the tool 104. Electrically insulative layer 210 provides an enhancement for segregating housing and shroud currents. Electrically insulative layer 210 also provides a region to accept an optional induction loop (discussed later in relation to FIG. 8. Such insulation can be achieved by using an insulative coating, such as relatively low dielectric strength nonconductive paint. Kapton tape (0.002 inches or 0.05 mm or similar means can alternatively be utilized.

Referring back to FIGS. 2A and 2B, each current transformer of the fixture 106 is electrically connected to the shroud to inductively receive and/or inject, through the housing 204, a current from or into the electronics 250 contained within the housing 204 of the tool 104. The induced current is produced as a magnetic flux 280/282 is produced inside the housing 204 (a magnetic flux 280 of FIG. 2A which is into the page, or a magnetic flux 282 of FIG. 2B which is out of the page, and which is received and/or conveyed from or into the tool 104. The induced current is part of a communication between the tool 104 and the equipment.

The communication can be a data communication between the tool 104 and the equipment, a transfer of electrical power from the equipment to the tool 104, or both, even occurring simultaneously. The data communication can be bidirectional data communication. Note that the equipment is configured to control at least some of part of the communication (e.g. receive function, transmit function, or powering and/or charging function between the equipment and the tool 104.

Thus, when the tool 104 is being prepared for a job, or following downhole logging operations (e.g. FIG. 1, the tool 104 can clamped into the fixture 106 with the shroud 202 being clamped at the two ends of the housing 204 at or near first and second contact surfaces 220 and 222. This is done without the need to open the tool's 104 pressure seal or make contact with any exposed connectors or ports. Here, what is exploited is the (relatively poor conductivity of the housing 204 by clamping the highly conductive shroud 202 on the outside circumference of the housing 204.

The shroud 202 shunts a portion of the electrical current which is caused to flow in the housing 204 and detected by the electronics 250. Conversely, shunted electrical current flowing into the shroud 202 is sensed when receiving a communication from the electronics 250 located within the housing 204. In the same or similar manner, data and power can both be transferred to the electronics 250 and an energy storage device by injecting currents into the shroud 202 as described. An energy storage device can include charging circuitry with an energy storage means, such as one or more rechargeable batteries.

Turning again to FIG. 3, the currents through the shroud 202 pass through the current transformers 201, 203 which can provide a single turn primary winding. The current transformers 201, 203 utilized can be very low impedance transformers. Second windings from all transformers are connected in parallel, delivering a total current that represents the shield current scaled by the turn's ratio of the transformer. In some example environments, the turn ratios can be within the range of 1:100 to 1:200, but other ranges well outside this range are acceptable.

FIG. 2A more particularly shows the fixture 106 inductively receiving a current from the tool 104 (e.g. receive data communication from tool 104. The plurality of current transformers 201 which include current transformers 205 and 207 for inductively receiving the current may be referred to as current sense transformers. On the other hand, FIG. 2B more particularly shows the fixture 106 inductively injecting a current into the tool (e.g. transmit data communication to tool 104, or transfer electrical power to tool 104. The plurality of current transformers 203 which include current transformers 209 and 211 for inductively injecting the current may be referred to as current injection transformers. Directions of the magnetic flux 280 (FIGS. 2A and 282 (FIG. 2B which are produced are revealed.

Figure 8:
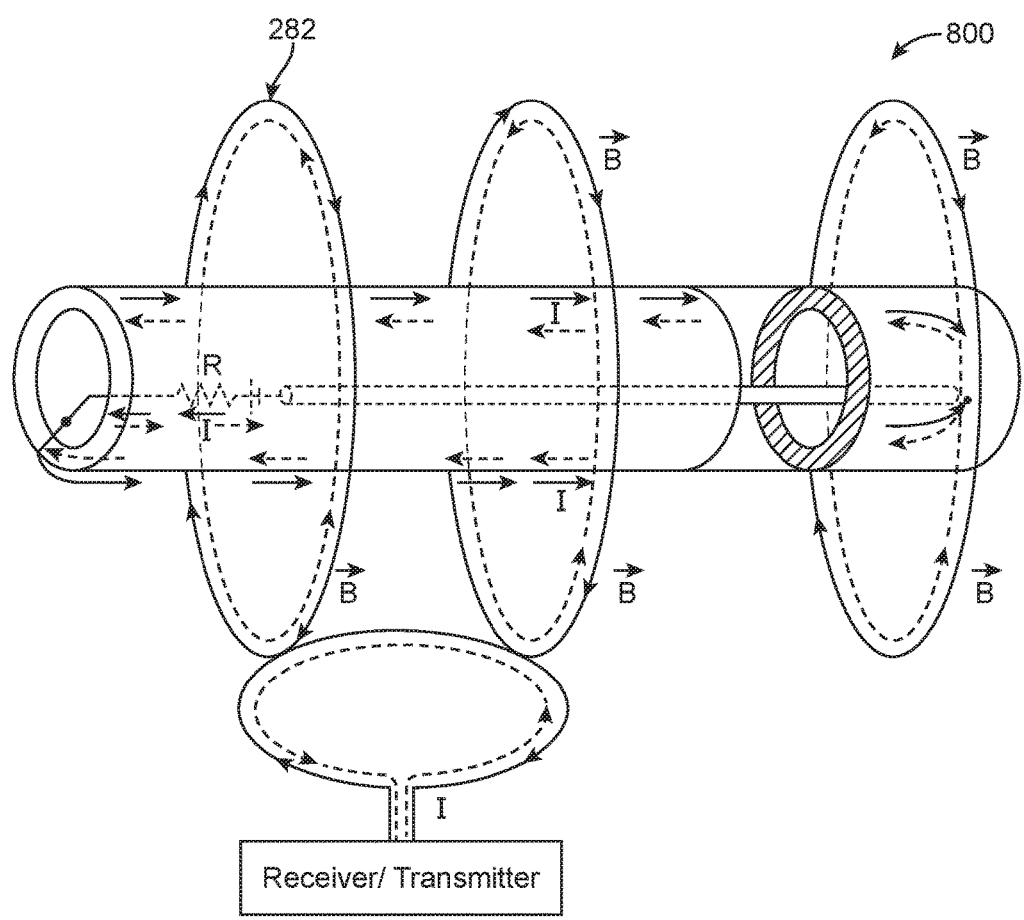
FIG. 8 is a diagram illustrating another example circuit for a fixture assembly, according to aspects of the present disclosure.

In combination with FIGS. 2A, 2B, and 3, FIGS. 4A and 4B are additional cross-sectional views of two variations on the fixture assembly of the present disclosure, showing the current and resulting magnetic flux paths. Also in combination, FIG. 8 is an alternative circuit for current sensing, showing the current and resulting magnetic flux 282 given a current flow I.

According to the present disclosure, communication can be achieved by forming a current loop internal to the tool 104. In other communication applications, communication buses can inject a voltage signal into a properly-terminated transmission line, where the voltage signal is received. However, this technique forces a current into a line that has short-circuited termination, where the current is sensed by a current sensor. One goal is to divide currents between conductors while using these currents to transfer information and/or power within a closed tool. Thus, such current loops can be utilized in low signal and high-noise environments for the communications described herein.

Using the current loop technique, FIGS. 5 and 6 show electrically equivalent circuits of the fixture assembly of the present disclosure. FIG. 5 more particularly shows an equivalent circuit 500 of the fixture which is inductively receiving a current from the tool (e.g. corresponding to FIG. 2A. In FIG. 5, equivalent circuit 500 illustrates a resistor 502 having resistance of $R_{Cu}$ (i.e. the resistance of the shroud, a resistor 504 having a resistance of $R_{SS}$ (i.e. the resistance of the housing, e.g. stainless steel "SS", and a resistor 506 having a resistance of $R_W$ (i.e. the resistance of the wire and its contact resistance with the connection made to the inside of the housing, as well as the parasitic resistance resulting from the tool's receiver electronics. The resistance values of these components can be AC resistance values, which can be determined in advance using well-known techniques. Resistors 502, 504 and 506 are electrically connected as shown in FIG. 5. A current 512 of $I_{Cu}$ flows through resistor 502, a current 514 of $I_{Cu}$ flows through resistor 504, and a current source 510 (i.e. representing the current source within the tool that is transmitting data having a current $I_{xmit}$ is coupled in series with resistor 506.

Resulting current ratios can be predicted from FIG. 5 based on the following equation:

$$I_{Cu}=I_{xmit}(R_{SS}/(R_{SS}+R_{Cu}).$$

FIG. 6 more particularly shows an equivalent circuit 600 of the fixture which is inductively injecting a current into the tool (e.g. corresponding to FIG. 2B. Equivalent circuit 600 of FIG. 6 is essentially the same as that of FIG. 5, except modeled with the tool in the proper mode. In particular, current source 510 of FIG. 5 is removed and a current injector 610 (i.e. representing the current transformer, which may be referred to as a current injection transformer having a current $I_{xmit}$ is placed in series with resistor 502. The current transformers of the fixture inductively couple the current from current injector 610 into the shroud, which causes currents to flow in the housing and receiver. The current can be identified and selected for design based on the following equation:

$$I_{Rw}=I_{xmit}(R_{SS}/(R_{SS}+R_W).$$

Note that relatively little power (0.1 W can be required from the electronics for injecting relatively large currents (~1 A into the tool's housing, because voltage drops in the closed circuit are small.

FIG. 7 shows an equivalent circuit 700 of the fixture inductively injecting a powering or charging current into the tool for powering or charging the tool. This circuit 700 is based on use of a current loop technique. Equivalent circuit 700 of FIG. 7 is essentially the same as that of circuit 600 of FIG. 6, except that a power converter 702 input can be placed in series with resistor 506 and an energy storage device 704 can be placed in parallel with power converter 702 output. The current 620 of $I_{Rw}$ can be replaced with a current 720 of $I_{PWR}$, which produces a voltage 722 of $V_{PWR}$. Additionally, the current injector 610 is replaced with a current injector 710, and the current injector 710 can be configured to transmit low frequency power to the tool. In at least one example, the current injector can have characteristics as described in both FIGS. 6 and 7.

Power transfer can be delivered from the equipment (e.g. equipment 110 of FIGS. 1A and 1B concurrently with bidirectional data communications as described earlier. This is made possible by the frequency separation between high-speed communications and low frequency power delivery, which is later discussed in relation to FIG. 10. Here, current injector 720 will operate in parallel concurrently with current injector 610 of FIG. 6. The input to the power converter appears as a virtual short circuit at the higher communications frequency. Power delivery can in fact be delivered as direct current (DC. In some examples, the system delivers power at alternating current (AC utility frequencies in the range of 50 Hz to 60 Hz, for convenience.

Step-down transformers can be used in the equipment to deliver 100A, 200A or more into the shroud at the local line frequency. However, only 100 W to 300 W of power is dissipated. The power converter 702 provides power factor correction, and can operate in a peak-power-tracking configuration (e.g. similar to that commonly used for solar array power conversion. The power converter 702 provides processed power for charging an energy storage device, and energizing tool electronics 250 while the tool is in a communications mode. Although total power efficiency for the system can be approximately 10%, inefficiency is of secondary concern when operating from utility power.

FIG. 8 depicts another mechanism 800 for detecting currents that are shunted into the shroud with use of a receiver/transmitter that operates as a current sensor when receiving data transmitted from the tool and as an exciter when the surface equipment transmits data to the tool. As illustrated, the solid lines show the current flowing when the tool is providing data to the surface equipment and the dashed lines illustrate the current of the surface equipment transmitting to the tool. This can be done in a bidirectional fashion as illustrated. Magnetic flux 282, proportional to the shroud current's magnitude, is induced into an insulative layer between the housing and the shroud. An induction loop that encloses the insulative layer may be utilized to communicate with the tool. This provides an alternative way to use the current transformers to more directly sense the shroud's current.

Referring back to FIG. 4A, the fixture assembly 102 is shown where tool 104 is fully wrapped about 360 degrees by shroud 202 in its fixture 106. In this example, the shroud 202 can have a wall thickness that is approximately 1-2 times that of the housing (0.25 inches or 0.64 cm, although any suitable thickness can be utilized.

Figure 4A:
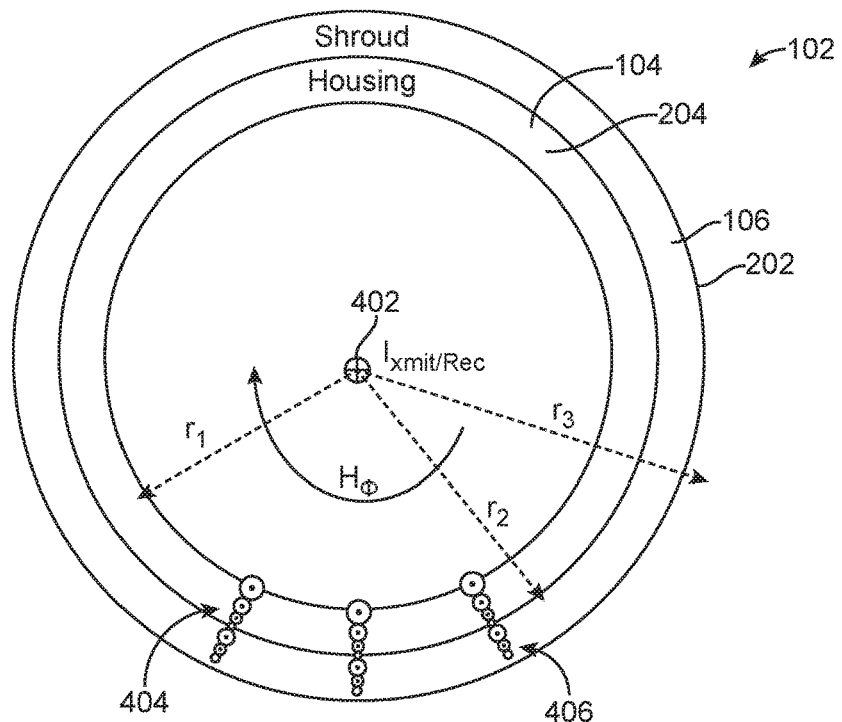
FIGS. 4A and 4B are diagrams illustrating two fixture assembly examples, according to aspects of the present disclosure.

In FIG. 4A, the reference direction of a current through a wire 402, which flows into the page at a center of the tool 104, is shown. This current thread terminates at or near the ends of the housing 204, forming a closed path coaxial segment with a magnetic field component with directionality as shown in the illustration. The magnetic field intensity can fall exponentially as it enters the housing 204 along the radius of the tool (r1-to-r2, and the magnitude of the conduction current density 404 or 406 can decay correspondingly. The shroud 202 can be more conductive than the tool's housing 204, resulting in a discontinuity in current densities 404 and 406 at the boundary between the two metals. As the magnetic field penetrates more deeply into the shroud 202 (r2-to-r3, it continues to fall exponentially but with greater attenuation than before due to the higher conductivity of the shroud 202.

Figure 4B:
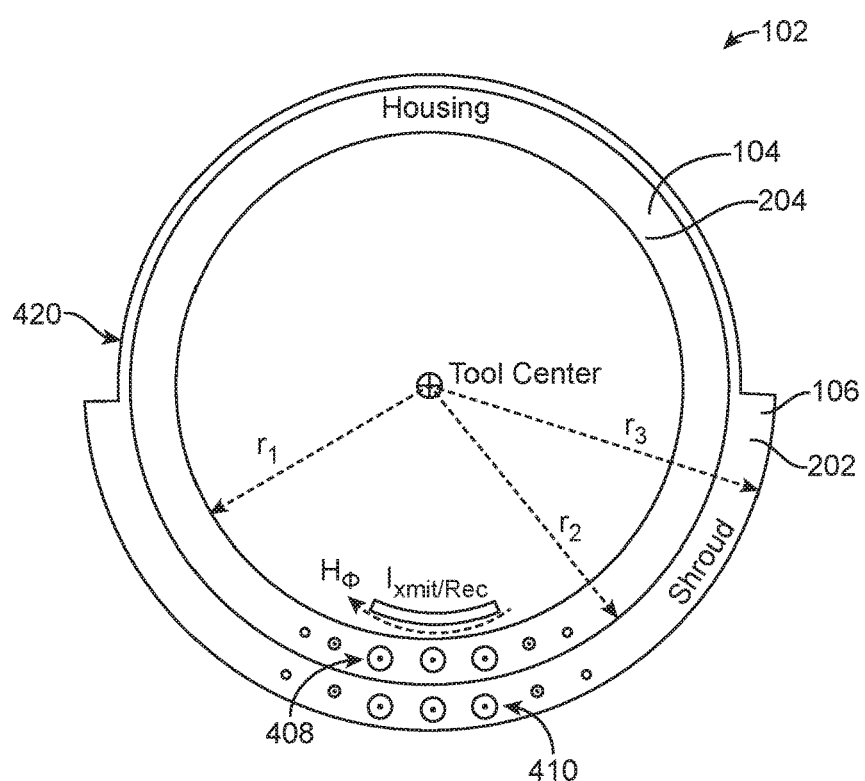

FIG. 4B shows an additional cross-sectional view of a variation on the fixture assembly 102 of the present disclosure. In this configuration, the tool 104 is placed inside of the shroud 202 with the tool 104 oriented properly. The shroud 202 can be trough-shaped with straps at each end that clamp the tool 104 to the shroud 202 with considerable force (e.g. 50 pounds per square inch, for example the configurations illustrated in FIGS. 1A and 1B. Clamping the tool 104 with a high pressure contact minimizes contact resistance between the tool 104 and the shroud 202 in the regions where current flow is desired.

Note that the configuration of FIG. 4B can provide a current return path using a thick (e.g. 0.2 inches, copper, semicircular strap placed close, but insulated from, the ID of the tool's housing 204. As a result, magnetic flux concentration can occur between the two surfaces, causing diffused image currents to form in the housing 204 and the shroud 202. Current densities 408 and 410 can fall exponentially with penetration into the metals similar to that in FIG. 4A, but they also fall quickly along the circumference when moving away from the internal conductor. Current crowding in the housing 204 and the shroud 202 can reduce the effective cross-sectional conduction area, reducing sensitivity-to-contact resistance. As a result of the configuration of FIG. 4B, higher frequency communications can be supported and increased power can be transferred. Placing the return current close to the housing's ID can also lower the flux density deep inside the tool 104, thereby reducing interference levels.

Figure 9:
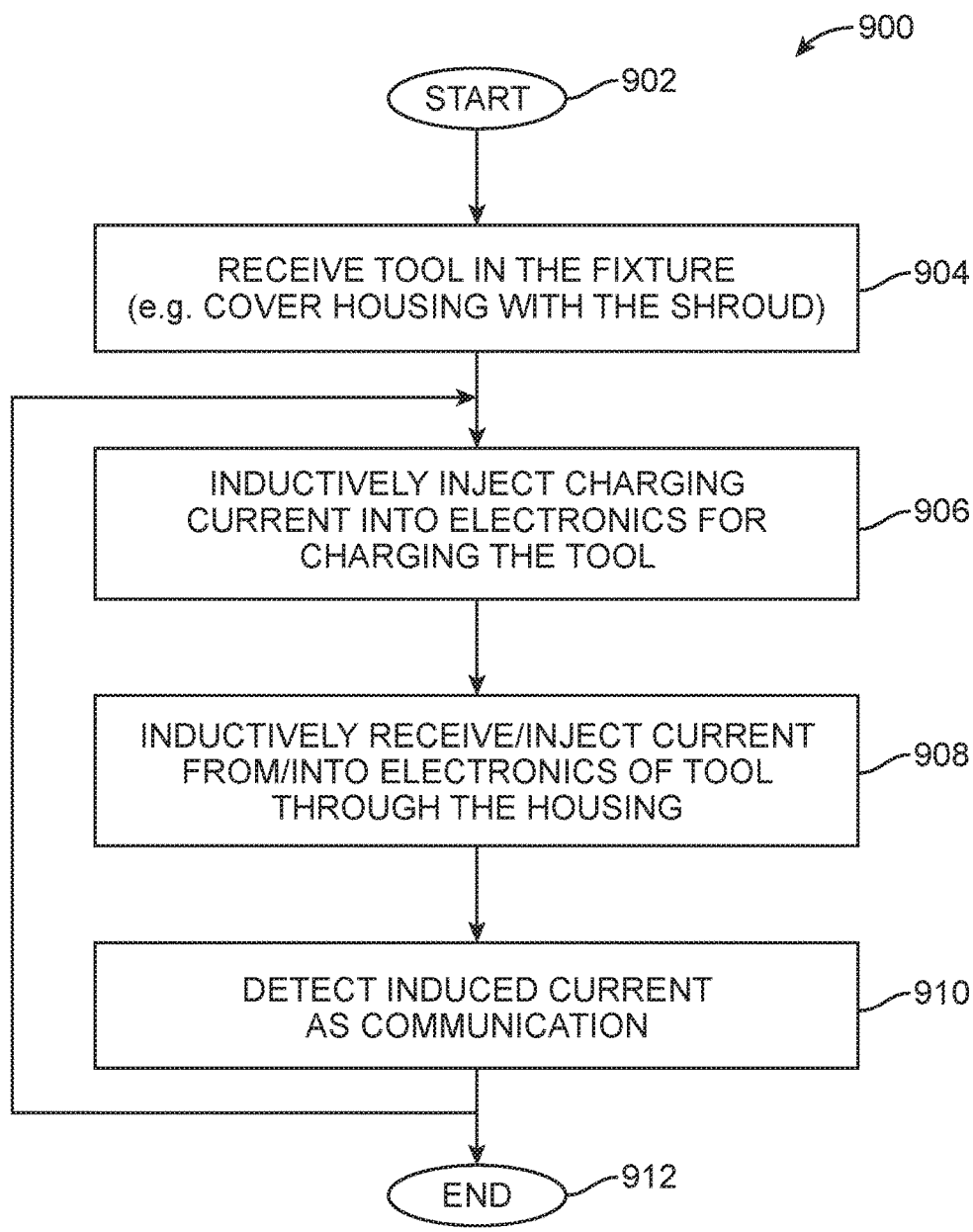
FIG. 9 is a flowchart illustrating an example method for facilitating a communication between a tool and equipment with use of the fixture, according to aspects of the present disclosure.

FIG. 9 is a flowchart 900 for use in describing a method for facilitating a communication between a tool and equipment with use of the fixture of the present disclosure.

The method can be utilized with use of the fixture 106 as previously described in relation to FIGS. 1-8 above, in the environment of FIGS. 1A and 1B or other suitable environment. The fixture comprises a shroud and at least one transceiver which includes one or more current transformers or sensors coupled to the shroud.

Beginning at a start block 902 of FIG. 9, a tool is received in the fixture (block 904. This step can include at least partially covering an outside circumference of a housing of the tool with the shroud.

The method can further include inductively injecting a charging current, via a charging current transformer and through the housing, for receipt into the electronics contained within the housing of the tool (block 906. This action can be a transfer of power from the equipment to the tool, for electrically powering the tool or charging its energy storage device (e.g. a battery.

Additionally, the method can include inductively receiving or injecting, via the current transformer and through the housing, a current from or into electronics contained within the housing of the tool (block 908. In addition, the method can include the induced current being detected as a communication between the equipment and the tool (block 910. The communication can be a data communication between the tool and the equipment.

As is apparent, both data communication and power delivery can be achieved from the fixture, and can even be performed simultaneously.

In some examples of the method of FIG. 9 where the current transformer comprises a first current transformer (i.e. a current sense transformer for receiving the induced current from the tool in block 908, the fixture can include a second current transformer (i.e. a current injection transformer for injecting a current into the tool. Here, the method can additionally include inductively injecting a current, via the second current transformer and through the housing, into the electronics contained within the housing of the tool. Together, the induced currents (i.e. the received induced current and the injected induced current can be detected as a bidirectional data communication between the tool and the equipment.

Figure 10:
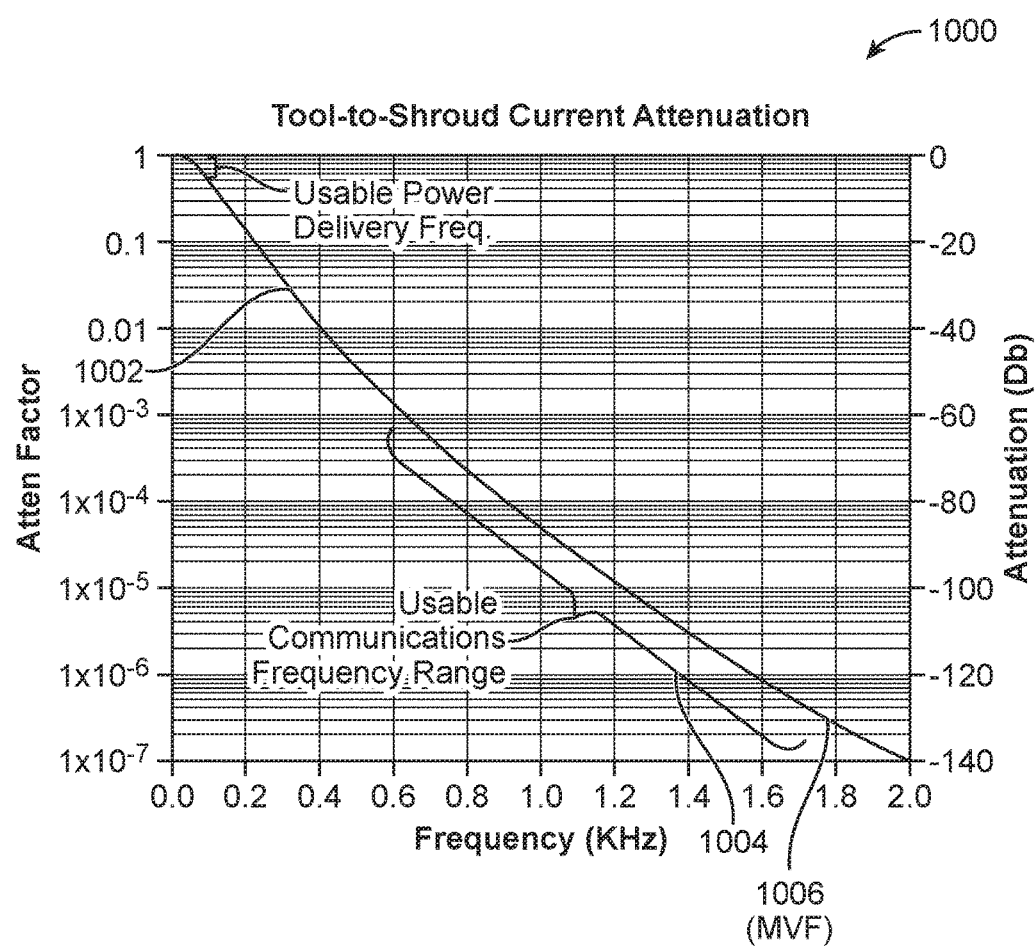
FIG. 10 is a graph showing a relationship for tool-to-shroud current attenuation, according to aspects of the present disclosure.

FIG. 10 is a graph 1000 showing a mathematical relationship 1000 for tool-to-shroud current attenuation, for use in describing one example of a usable frequency range 1004 for the communication between the tool and the equipment. Graph 1000 provides an example of signal attenuation levels as a function of frequency that results when using a conventional Slickline tool pressure housing configured as shown in FIG. 4B.

Little attenuation results when transferring power at line frequencies. However, significant signal loss occurs at higher communication frequencies. Significant improvements are possible by using the configuration shown in FIG. 4B and by using pressure housing materials with preferred properties (e.g. nonmagnetic steel and/or greater resistivities. Further improvements can be achieved by driving higher current levels and by using low noise receivers.

Many suitable techniques can be utilized to identify a usable frequency or frequency range for communication. In some examples, in order to identify and establish a usable frequency, power can initially applied to the tool when it placed (e.g. clamped into the fixture. The fixture would then begin attempting a communication to the tool (e.g. "pinging" at a high frequency and expecting a reply. After each attempt with no reply, the frequency can be reduced, and this is done in steps. This procedure is done until the tool finally echoes a reply indicating that a handshake has been established at a maximum usable frequency (MUF 1006. Here, the MUF 1006 (or any suitable usable frequency within range can be saved in memory of the tool, and bidirectional data communication can occur at this frequency.

This technique may be summarized as follows, for use in selecting a usable or maximum usable frequency for the communication of the present disclosure. A test communication is sent to the electronics at a given frequency. The sending of the test communication is repeated at a next frequency when there is no reply from the electronics. The (e.g. first frequency for a test communication when a reply is received is then identified. This identified frequency is set as a usable or maximum usable frequency for the communication between the tool and the equipment.

Figure 12:
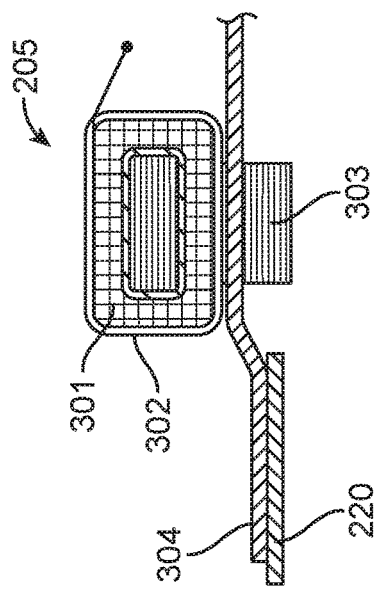
FIG. 12 is a cross section of the current transformer of FIG. 11 FIG. 11 along section line 12-12 in FIG. 11.
Figure 13:
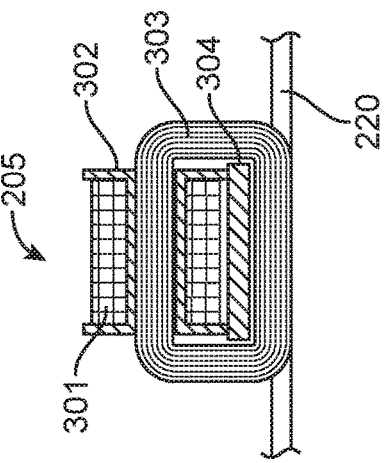
FIG. 13 is a cross section of the current transformer of FIG. 11 along section line 13-13 in FIG. 11.
Figure 11:
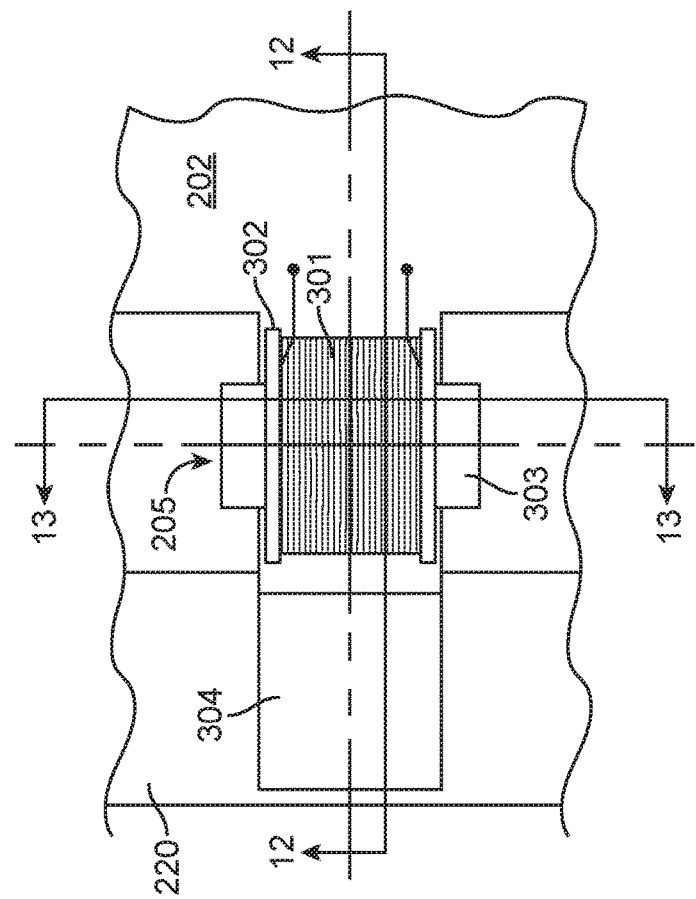
FIG. 11 is an enlarged view of one of the current transformers introduced in FIG. 3.

FIGS. 11, 12 and 13 show an example of the construction of the current transformer 205. The transformer 205 has a high impedance winding 301 of multiple turns of copper wire on a plastic bobbin 302. A ferromagnetic core 303 of permalloy tape is wound through the central hole of the bobbin 302. In an alternative construction, the ferromagnetic core is a split core, in which case one half of the split core is slipped into the central hole of the bobbin and then the two pieces of the split core are fastened together. In either case, the assembly of the winding 301, bobbin 302, and core 303 is slid onto a metal finger 304 extending from the shroud 202. Thus, the metal finger 304 becomes a low impedance winding of the transformer 205. The metal finger 304 is fastened and electrically connected to the tool-to-shroud contact 202, for example by soldering, brazing, or welding.

Figure 14:
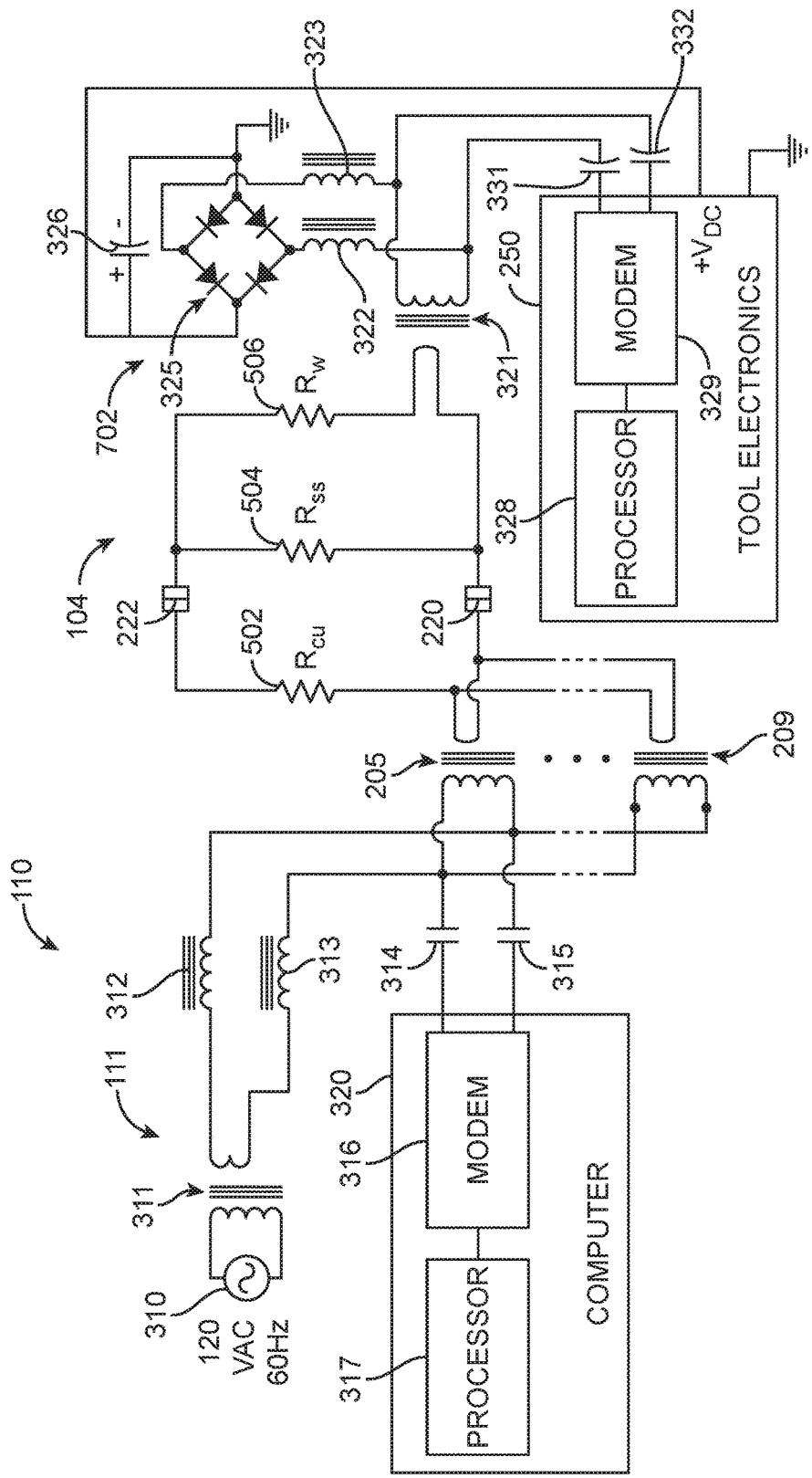
FIG. 14 is a schematic diagram showing an example of circuitry for simultaneous communication of electrical power and data between the tool and the equipment introduced in FIG. 1A.

FIG. 14 shows an example of circuitry for simultaneous communication of electrical power and a data between the tool 104 and equipment 110. In this example the power supply 111 includes a step-down transformer 311 that receives 120 volts AC at 60 Hertz from a power source 310 (such as an electrical outlet and produces 24 or 48 volts AC for exciting the high impedance windings of the current transformers 205, 209. For injecting or receiving a data signal, audio frequency chokes 312, 313 are coupled between the step-down transformer 311 and the high impedance windings of the current transformers 205, 209, and capacitors 314 and 315 couple the data signal between a modem 316 and the high impedance windings of the current transformers. The modem 316 is coupled to a processor of a computer 320 for transmitting or receiving data conveyed by the data signal.

The tool 104 includes a current transformer 321 similar to the transformers 205 and 209 and having its low impedance winding connected in series with the resistance $R_w$ 506. The high impedance winding of the current transformer 321 is connected through audio frequency chokes 322, 323 to the power supply circuit 702. In this example, the power supply circuit 702 includes a full wave rectifier bridge 325 and an electrolytic capacitor 326 to provide a direct current supply voltage (+$V_{DC}$ to the tool electronics 250. The tool electronics 250 include a processor 328 and a modem 329 coupled to the processor for transmitting or receiving data conveyed by the data signal. Capacitors 331 and 332 couple the modem 329 to the high impedance winding of the transformer 321 for receiving or transmitting the data signal.

As provided herein, a fixture shaped to receive a tool for facilitating a communication between the tool and other equipment has been described. The fixture can include a shroud sized to at least partially cover an outside circumference of a housing of the tool, and one or more current transformers which are coupled to the shroud. Each current transformer can be electrically connected to the shroud to inductively receive or inject, through the housing, a current from or into electronics contained within the housing of the tool. The induced current can be part of the communication between the tool and the equipment. The communication can be a data communication between the tool and the equipment, a transfer of electrical power from the equipment to the tool, or both.

The examples shown and described above are only examples. Many details are often found in the art such as the other features of a fixture and a tool. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached claims. It will therefore be appreciated that the examples described above can be modified within the scope of the appended claims.

Numerous examples are provided herein to enhance understanding of the present disclosure. A specific set of examples are provided as follows. In a first example disclosed herein, there is disclosed a fixture 106 for receiving a tool 104 and facilitating communication between the tool 104 and equipment 110, the fixture 106 including a shroud 202 having a contact surface 220, 222 and sized to accommodate the tool 104; a current transformer 205, 207, 209, 211 coupled to the shroud 202 and electrically coupled to the contact surface 220, 222; and a communication channel 108 communicably coupled to the current transformer 205, 207, 209, 211.

In a second example, there is disclosed herein the fixture 106 according to the first example, wherein data is communicable between the tool 104 and the equipment 110 through the communication channel 108.

In a third example, there is disclosed herein the fixture 106 according to the first or second examples, wherein electrical power is transferrable from the equipment 110 to the tool 104 through the current transformer 205.

In a fourth example, there is disclosed herein the fixture 106 according to any of the preceding examples first to the third, wherein the fixture 106 is absent from the inside of the housing 204 of the tool 104, the fixture 106 further including an electrically insulative layer 210 between the shroud 202 and the housing 204.

In a fifth example, there is disclosed herein the fixture 106 according to any of the preceding examples first to the fourth, further including a clamp 107 sized to pressure contact at least part of the shroud 202 to the outside circumference of the housing 204 of the tool 104.

In a sixth example, there is disclosed herein the fixture 106 according to any of the preceding examples first to the fifth, further including a plurality of current transformers 201, 203, each current transformer being electrically coupled to the contact surface 220, 222 to inductively receive or inject a current from or into electronics 250 contained within the housing 204 of the tool 104, the induced current being part of the communication between the tool 104 and the equipment 110.

In a seventh example, there is disclosed herein the fixture 106 according to any of the preceding examples first to the sixth, wherein the current transformer 205 comprises a current injection transformer to inductively inject the current into the electronics 250 contained with the housing 204 of the tool 104.

In an eighth example, there is disclosed herein the fixture 106 according to any of the preceding examples first to the seventh, wherein the current transformer 205 comprises a current sense transformer to inductively receive the current from the electronics 250 contained with the housing 204 of the tool 104.

In a ninth example, there is disclosed herein the fixture 106 according to any of the preceding examples first to the eighth, wherein the current transformer 205 comprises a first current transformer and the communication comprises a data communication between the tool 104 and the equipment 110, the fixture 106 further including a second current transformer 209, the second current transformer 209 being electrically coupled to the contact surface 220, 222 to inductively inject a charging current into electronics 250 contained within the housing 204 of the tool 104, the induced charging current being part of a transfer of electrical power from the equipment 110 to the tool 104.

In a tenth example, there is disclosed herein a fixture assembly 102 for facilitating communication between a tool 104 and equipment 110, the fixture 106 including a tool 104 comprising a housing 204 and electronics 250 contained within the housing 204; a fixture 106 which shaped to receive the tool 104, the fixture 106 including a shroud 202 sized to at least partially cover a circumference of a housing 204 of the tool 104; a transceiver comprising a current transformer 205 which is coupled to the shroud 202; and the current transformer 205 being coupled to the equipment to receive or inject, through the housing 204 of the tool 104, a current from or into electronics 250 contained within the housing 204 of the tool 104, the current being part of the communication between the tool 104 and the equipment 110.

In an eleventh example, there is disclosed herein the fixture assembly 102 according to the tenth example, wherein the communication comprises at least one of data communication between the tool 104 and the equipment 110 and a transfer of electrical power from the equipment 110 to the tool 104.

In an twelfth example, there is disclosed herein the fixture assembly 102 according to the tenth or eleventh examples, further including an electrically insulative layer 210 formed between the shroud 202 and the housing 202.

In a thirteenth example, there is disclosed herein the fixture assembly 102 according to any of the preceding examples tenth to the twelfth, further including a plurality of transceivers, each transceiver comprising a current transformer.

In a fourteenth example, there is disclosed herein the fixture assembly 102 according to any of the preceding examples tenth to the thirteenth, wherein the current transformer 205 comprises a current injection transformer to inductively inject the current into the electronics 250 contained with the housing 204 of the tool 104.

In a fifteenth example, there is disclosed herein the fixture assembly 102 according to any of the preceding examples tenth to the fourteenth, wherein the current transformer 205 comprises a current sense transformer to inductively receive the current from the electronics 250 contained within the housing 204 of the tool 104.

In a sixteenth example, there is disclosed herein a fixture 106 for facilitating a bidirectional data communication between a tool 104 and equipment 110, the fixture 106 including a shroud 202 sized to least partially cover an outside circumference of a housing 204 of the tool 104; a current sense transformer 205 coupled to the shroud to inductively receive, through the housing 204 of the tool 104, a current from electronics 250 contained within the housing 204 of the tool 104; and a current injection transformer 209 coupled to the shroud to inductively inject, through the housing 204 of the tool 104, a current into the electronics 250 contained within the housing 204 of the tool 104; wherein the inductively received and injected currents are part of the bidirectional data communication between the tool 104 and the equipment 110.

In a seventeenth example, there is disclosed herein the fixture 106 according to the sixteenth example, wherein the communication further comprises a transfer of electrical power from the equipment 110 to the tool 104, and the current transformers 203 include at least one charging current injection transformer 209 to inductively inject a charging current into the electronics 250 contained within the housing 202 of the tool 104.

In a eighteenth example, there is disclosed herein a method of facilitating communication between a tool 104 and equipment 110 with use of a fixture 106, the fixture 106 including a shroud 202 and a transceiver which comprises a current transformer 205 coupled to the shroud 202, the method including at least partially covering a circumference of a housing 204 of the tool 104 with the shroud 202; inductively receiving or injecting, via the current transformer 205 and through the housing 204, a current from or into electronics 250 contained within the housing 204 of the tool 104; and determining the presence of a communication by detecting the induced current.

In a nineteenth example, there is disclosed herein the method according to the eighteenth example, wherein the communication comprises at least one of a data communication between the tool 104 and the equipment 110 and a transfer of electrical power from the equipment 110 to the tool 104.

In a twentieth example, there is disclosed herein the method of eighteenth or nineteenth examples, wherein the current transformer 205 comprises a first current transformer of the fixture 106 and the act of inductively receiving or injecting the current further comprises inductively receiving the current from the electronics 250 of the tool 104, and the method further including inductively injecting a current, via a second current transformer 209 and through the housing 204, into the electronics 250 contained within the housing 204 of the tool 104; and detecting the induced currents as a bidirectional communication between the tool 104 and the equipment 110.

In a twenty first example, there is disclosed herein the method according to any of the preceding examples eighteenth to the twentieth, further including sending a test communication to the electronics 250 at a given frequency; repeating the sending of a test communication at a next frequency when there is no reply from the electronics 250; identifying the frequency utilized when receiving a reply from the electronics 250; and setting the identified frequency as a maximum usable frequency for the communication between the tool and the equipment.

What is claimed is:

1. A fixture for receiving a tool and facilitating communication between the tool and equipment, the fixture comprising:
    a shroud having a contact surface and sized to accommodate the tool;
    a current transformer coupled to the shroud and electrically coupled to the contact surface; and
    a communication channel communicably coupled to the current transformer.

2. The fixture of claim 1, wherein data is communicable between the tool and the equipment through the communication channel.

3. The fixture of claim 1, wherein electrical power is transferrable from the equipment to the tool through the current transformer.

4. The fixture of claim 1, wherein the fixture is absent from the inside of the housing of the tool, the fixture further comprising:
an electrically insulative layer between the shroud and the housing.

5. The fixture of claim 1, further comprising:
a clamp sized to pressure contact at least part of the shroud to the outside circumference of the housing of the tool.

6. The fixture of claim 1, further comprising:
a plurality of current transformers, each current transformer being electrically coupled to the contact surface to inductively receive or inject a current from or into electronics contained within the housing of the tool, the induced current being part of the communication between the tool and the equipment.

7. The fixture of claim 1, wherein the current transformer (205 comprises a current injection transformer to inductively inject the current into the electronics contained with the housing of the tool.

8. The fixture of claim 1, wherein the current transformer comprises a current sense transformer to inductively receive the current from the electronics contained with the housing of the tool.

9. The fixture of claim 1, wherein the current transformer comprises a first current transformer and the communication comprises a data communication between the tool and the equipment, the fixture further comprising:
a second current transformer, the second current transformer being electrically coupled to the contact surface to inductively inject a charging current into electronics contained within the housing of the tool, the induced charging current being part of a transfer of electrical power from the equipment to the tool.

10. A fixture assembly for facilitating communication between a tool and equipment, the fixture comprising:
a tool comprising a housing and electronics contained within the housing;
a fixture which shaped to receive the tool, the fixture including:
a shroud sized to at least partially cover a circumference of a housing of the tool;
a transceiver comprising a current transformer which is coupled to the shroud; and
the current transformer being coupled to the equipment to inductively receive or inject, through the housing of the tool, a current from or into electronics contained within the housing of the tool, the inductively received or injected current being part of the communication between the tool and the equipment.

11. The fixture assembly of claim 10, wherein the communication comprises at least one of data communication between the tool and the equipment and a transfer of electrical power from the equipment to the tool.

12. The fixture assembly of claim 10, further comprising:
an electrically insulative layer formed between the shroud and the housing.

13. The fixture assembly of claim 10, further comprising:
a plurality of transceivers, each transceiver comprising a current transformer.

14. The fixture assembly of claim 10, wherein the current transformer comprises a current injection transformer to inductively inject the current into the electronics contained with the housing of the tool.

15. The fixture assembly of claim 10, wherein the current transformer comprises a current sense transformer to inductively receive the current from the electronics contained within the housing of the tool.

16. A fixture for facilitating a bidirectional data communication between a tool and equipment, the fixture comprising:
a shroud sized to least partially cover an outside circumference of a housing of the tool;
a current sense transformer coupled to the shroud to inductively receive, through the housing of the tool, a current from electronics contained within the housing of the tool; and
a current injection transformer coupled to the shroud to inductively inject, through the housing of the tool, a current into the electronics contained within the housing of the tool;
wherein the inductively received and injected currents are part of the bidirectional data communication between the tool and the equipment .

17. The fixture of claim 16, wherein the communication further comprises a transfer of electrical power from the equipment to the tool, and the current transformers include at least one charging current injection transformer to inductively inject a charging current into the electronics contained within the housing of the tool.

18. A method of facilitating communication between a tool and equipment with use of a fixture, the fixture including a shroud and a transceiver which comprises a current transformer coupled to the shroud, the method comprising:
at least partially covering a circumference of a housing of the tool with the shroud;
inductively receiving or injecting, via the current transformer and through the housing, a current from or into electronics contained within the housing of the tool; and
determining the presence of a communication by detecting the induced current.

19. The method of claim 18, wherein the communication comprises at least one of a data communication between the tool and the equipment and a transfer of electrical power from the equipment to the tool.

20. The method of claim 18, wherein the current transformer comprises a first current transformer of the fixture and the act of inductively receiving or injecting the current further comprises inductively receiving the current from the electronics of the tool, and the method further comprising:
inductively injecting a current, via a second current transformer and through the housing, into the electronics contained within the housing of the tool; and
detecting the induced currents as a bidirectional communication between the tool and the equipment.

21. The method of claim 18, further comprising:
sending a test communication to the electronics at a given frequency;
repeating the sending of a test communication at a next frequency when there is no reply from the electronics;
identifying the frequency utilized when receiving a reply from the electronics; and
setting the identified frequency as a maximum usable frequency for the communication between the tool and the equipment.

22. A fixture for receiving a tool for facilitating communication between the tool and equipment, the fixture comprising:
a shroud sized to at least partially cover an outside circumference of a housing of the tool; and a current sensor coupled to the shroud to inductively receive, through the housing of the tool, a current from electronics contained within the housing of the tool, the inductively received current being part of the communication between the tool and the equipment.

23. The fixture of claim 22, wherein the communication comprises a data communication between the tool and the equipment.

24. The fixture of claim 22, wherein the communication comprises a transfer of electrical power from the equipment to the tool.

25. The fixture of claim 22, further comprising:
an electrically insulative layer between the shroud and the housing.

* * * * *